May 31, 1949. F. J. EWING Re. 23,118
PROCESS FOR REFINING ANIMAL AND VEGETABLE OILS
Original Filed May 19, 1939
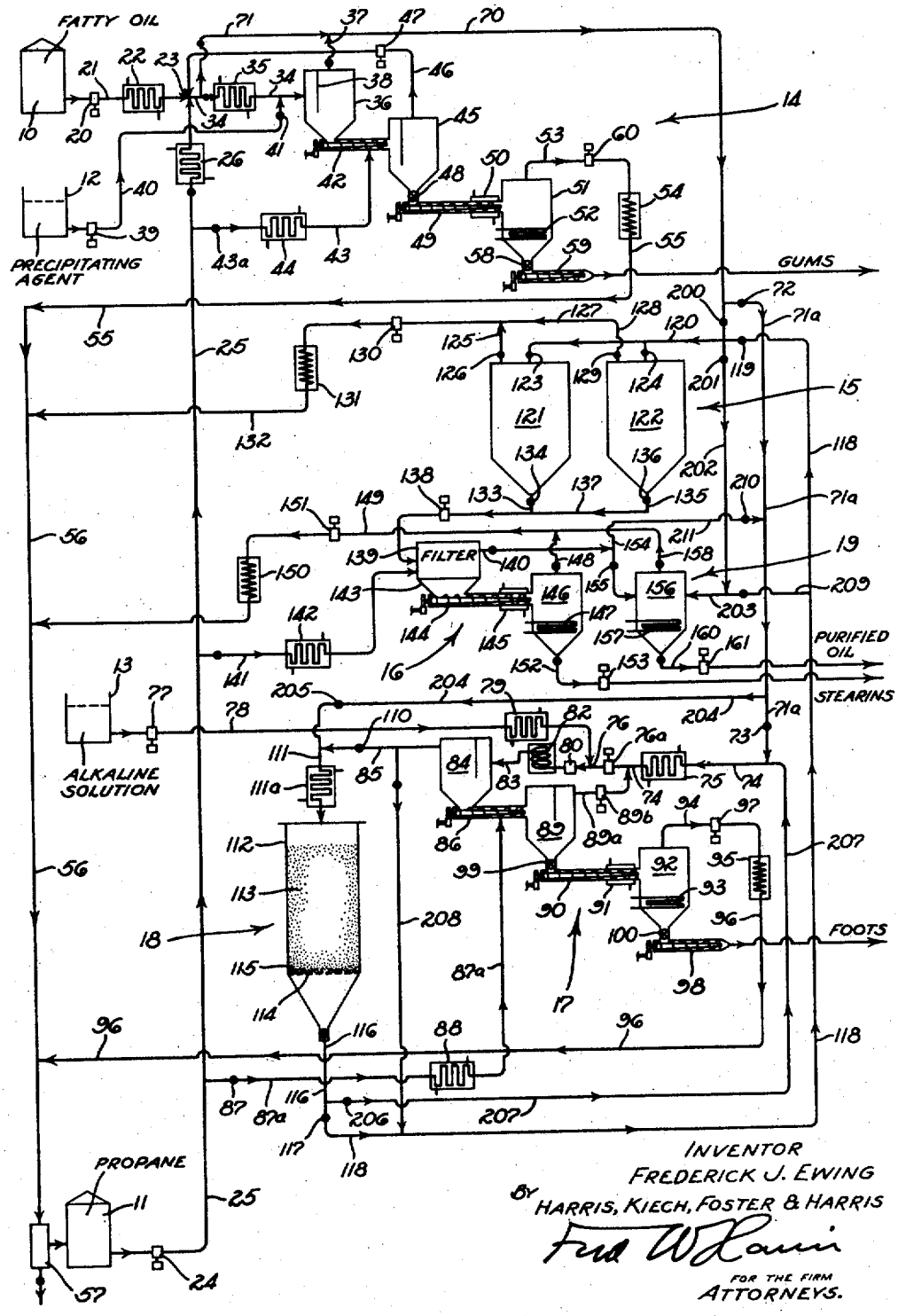
INVENTOR
FREDERICK J. EWING
BY HARRIS, KIECH, FOSTER & HARRIS
Fred W Harris
FOR THE FIRM
ATTORNEYS.

Reissued May 31, 1949 Re. 23,118

UNITED STATES PATENT OFFICE 23,118

PROCESS FOR REFINING ANIMAL AND VEGETABLE OILS

Frederick J. Ewing, Arcadia, Calif., assignor, by mesne assignments, to Benjamin Clayton, Houston, Tex., doing business as Refining, Unincorporated Original No. 2,288,441, dated June 30, 1942, Serial No. 274,649, May 19, 1939. Application for reissue September 17, 1948, Serial No. 49,761

19 Claims. (Cl. 260—428.5)

This invention relates to an improvement in refining of glyceride oils and fats and, more particularly, to the refining of fatty oils in the presence of a diluent.

The refining of fatty oils may comprise the removal of minor impurities, such as gums, phosphatides, and the like, the neutralization and removal of acidic materials, such as free fatty acids and acidic color bodies, the adsorption or bleaching of color bodies in general, and the removal of high melting point constituents. In refining, it is desirable from the standpoints of cost and quality that the separation of impurities be highly selective in character so that the impurities may be removed without substantial loss of good oil, and it is also desirable that the consumption of refining agents be reduced to a minimum.

It is a general object of the invention to provide an improved refining process of high selectivity, whereby impurities may be very substantially removed with little or no loss of good oil, and also to provide a process in which reagent consumption may be substantially minimized or, in some instances, completely avoided.

In accordance with this invention, these and other objects are achieved by refining the oil in the presence of a solvent-diluent having a selective or preferential solvent power for the good oil and having relatively little solvent power for the constituents or impurities which it is desired to remove, or for the modifications thereof which may be formed in the refining process. I have found that liquefiable, normally gaseous hydrocarbons, e. g., propane, are very excellent selective diluents in this capacity.

The above-mentioned minor impurities contained in the oil may comprise various materials which may be dissolved, or colloidally or mechanically suspended in the oil, e. g., fragments of seed meal or connective tissue, resins, gums, phosphatides such as lecithin, and similar materials. These materials are usually referred to in the art as gums or gummy materials, and the latter term is employed in the claims as being generic to the resins, phosphatides, etc., found in the crude fatty material. In conventional practice, such materials may be removed together with the fatty acids in an alkali-refining step, or they may be separately removed in an initial refining step in which they are flocculated or precipitated by a chemical reagent, e. g., an aqueous solution of an electrolyte, for instance, a dilute acid solution. The increasing importance of such materials as by-products makes it advantageous to remove them separately from the fatty acids, and this also results in the production of purer foots or soapstock during subsequent alkali refining. The necessity of employing a separate reagent for this step imposes extra costs on the refining process, however, and, in addition, there is an entrainment loss of good oil suffered during the precipitation of the minor impurities. Furthermore, the value of the precipitated impurities as by-products is frequently diminished by the deleterious action thereon of the precipitating reagent.

I have discovered that, upon diluting the crude oil with a liquefiable, normally gaseous hydrocarbon such as propane, the minor impurities are largely or even completely rejected by virtue of the selective action of the diluent, to form a precipitate which settles very rapidly from the fluid dilute oil. By washing the precipitate with a further portion of propane, for example, it may be obtained practically free from entrained oil and in a substantially unaltered form highly advantageous for working up into by-products. If desired, the precipitation may be hastened by the addition of a little water to hydrate the impurities but, in at least most instances, I find it unnecessary to add any precipitative reagent.

It is an object of my invention to provide a process for refining crude fatty oils and like materials by commingling therewith a selective diluent adapted to dissolve the oil and to precipitate minor impurities such as gums, phosphatides, and the like, more particularly with a diluent comprising liquefiable, normally gaseous hydrocarbons such as propane.

The removal of color bodies and adsorbable impurities is frequently accomplished by contacting the oil with an adsorptive agent such as fuller's earth or clay. The refining loss of good oil suffered in such a step is relatively high due to retention of oil in the pores of the clay. Furthermore, the adsorption of the color bodies is rarely complete, and, to obtain the desired reduction in color, it is frequently necessary to employ a relatively large proportion of clay which very substantially increases the cost of such refining, both as regards the clay and the refining loss of good oil.

I have found that the selectivity of the adsorbent is greatly increased when the oil is diluted with a diluent whereby the oil may be more effectively bleached with a smaller amount of clay, or a given amount of clay may be effective on a larger proportion of oil, and whereby the refining loss suffered in such treatment may be greatly minimized. I find that these advantages are particularly apparent when I use a selective diluent such as propane or other liquefiable, normally gaseous hydrocarbon.

It is an object of the present invention to provide an improved refining process for fatty oils in which the oil is contacted with an adsorptive agent in the presence of a diluent for the oil, more particularly a diluent comprising liquefiable, normally gaseous hydrocarbons such as propane.

It is frequently desirable to remove high melting point constituents from the fat or fatty oil. Such a removal may be desirable where a separation of the constituents for their various utilities is advantageous, or when it is desired to produce a fatty oil which will remain clear and fluid at low storage temperatures. The latter aspect may be illustrated with reference to the production from cottonseed oil of a wintered salad oil which will not cloud or congeal when stored at low temperatures, e. g., those of a domestic refrigerator. In conventional practice, the oil is wintered by chilling it to a low temperature at which there is substantial separation of solid stearins, and filtering it at this low temperature to separate the solidified higher melting point constituents. Various difficulties in this process are the expense and difficulty of chilling the oil with an external refrigerant, the high viscosity of the chilled mixture which makes filtration difficult, and the absence of sharp separation due to occlusion, mutual solubility, and other effects between the liquid and solid phases, which greatly decrease the yield or minimize the melting point differential between the solid and liquid fractions obtained, or both.

I have discovered that, in the presence of a diluent, the separation of low and high melting point constituents may be made much more selective, resulting in higher yields and greater melting point differentials between the products, and the process of filtration or other separative expedient is also greatly facilitated due to diminished viscosity, and to changes in the type of "filter cake" formed. I have found the use of such selective diluents as the liquefiable, normally gaseous hydrocarbons is particularly advantageous in the above capacity, and they moreover display a very considerable further advantage in that they make possible a simple and inexpensive chilling process in which the oil-hydrocarbon mixture is internally refrigerated by refrigerative evaporation of the diluent.

It is a further object of my invention to provide a process for refining of fatty oils in which higher melting point constituents are separated in the presence of a diluent, particularly a selective diluent such as propane or other liquefiable, normally gaseous hydrocarbons, and in which, if desired, the mixture may be chilled to the desired separation temperature by refrigerative evaporation of the diluent.

Other refining steps, such as the removal of free fatty acids, e. g., by contacting with an aqueous solution of an alkali, chemical bleaching, for example, by contacting with alkali or peroxide, and similar refining steps, may also be very advantageously practiced in the presence of a diluent, particularly one having selective properties, such as propane or other liquefiable, normally gaseous hydrocarbons. It is distinctly advantageous, therefore, to maintain the fatty oil in solution in the selective diluent throughout all of such refining steps as it may be necessary to employ to produce the desired refined product.

It is an object of the present invention to provide a refining process in which the crude fatty oil is initially commingled with a diluent, particularly a liquefiable, normally gaseous hydrocarbon diluent, and the oil maintained in association with more or less of said diluent throughout the entire refining procedure necessary to produce the desired refined product or products, more particularly where such procedure comprises one or more of the following steps: (*a*) removing minor impurities rejected by such dilution; (*b*) contacting the oil with an alkaline refining agent; (*c*) contacting the oil with an adsorptive refining agent; (*d*) internal or evaporative refrigeration of the solution; and (*e*) separation of higher melting point constituents.

Further objects and aspects of the invention will become apparent in the following discussion of the flow diagram shown in the drawing.

Referring to the drawing, there is there-illustrated a flow diagram for the refining of fatty oils in the presence of a diluent such as propane. Storage vessels 10, 11, 12, and 13 are shown for the respective storage of fatty oil, diluent (typically propane), precipitating agent for minor impurities, and alkaline solution for removal of fatty acids. The flow diagram illustrates schematically the equipment generally indicated by the numeral 14 for the removal of minor impurities, the equipment generally indicated by the numeral 15 for chilling, equipment generally indicated by the numeral 16 for the removal of higher melting point constituents, equipment generally indicated by the numeral 17 for alkali-refining and the removal of free fatty acids as foots, equipment generally indicated by the numeral 18 for refining with an adsorptive reagent, and evaporating equipment generally indicated by the numeral 19 for the removal of the diluent from the refined oil.

To follow the process in greater detail, crude oil is taken from the tank 10 and transferred by means of a pump 20 through a line 21 and a heat interchanger 22 to a juncture 23, at which point it is commingled with propane. The propane is brought to the juncture 23 by means of a pump 24 taking suction on the propane stored in the tank 11 and transferring it through a line 25 and a heat interchanger 26 to the juncture 23. The commingled streams of propane and crude oil flow through a line 34 and a heat interchanger 35 to a decanting vessel 36. Minor impurities which have been rejected or precipitated by the action of the propane on the oil are settled in the decanter 36, and the clear oil-propane solution is removed through a pipe 37. A baffle 38 may be provided, if desired, to prevent short-circuiting of the flow through the decanter.

Provision is made for the addition of water or precipitating agent ahead of the decanting vessel in such instances as this may be deemed advisable, such provision comprising a pump 39 taking suction on the water or solution in the tank 12 and causing it to flow through a pipe 40 and through a valve 41 into the line 34.

The impurities settling to the bottom of the decanter 36 may be suitably removed therefrom by means of a screw conveyor 42 or other means, operating either continuously or intermittently. The solids or slurry removed by the conveyor 42 will normally contain more or less entrained propane-oil solution and, in order to recover the oil content, provision is made for washing this slurry with fresh propane. Such provision may comprise a pipe 43 taking propane from the line 25 through a valve 43a and transferring it to the slurry, suitably in the conveyor 42. The propane may be brought to suitable washing temperature by means of a heat interchanger 44.

The commingled slurry and wash propane are transferred by the conveyor 42 into a decanter 45. The precipitates settle to the bottom of the decanter 45, and the clarified wash liquor is removed by means of a line 46 and a pump 47 and returned to the main liquid flow, suitably at the juncture 23.

The oil content of the solids settling to the bottom of the decanter 45 will have been very substantially reduced by the action of the wash propane, and this material may be worked up either continuously or intermittently for recovery of the diluent and production of diluent-free gums, phophatides, or other minor impurities. The washed impurities are removed from the decanter 45 through a valve 48 and transferred by means of a conveyor 49 which may be provided in part with a heating jacket 50 into an evaporator 51. The heat imparted by means of the jacket 50 and further heat which may be imparted, if desired, by means of the heating coil 52 positioned in the evaporator 51, serves to volatilize the propane contained in or associated with the precipitated impurities. The propane vapors are taken overhead through a line 53 and are condensed in a condenser 54, and the liquid propane condensate is returned by means of a line 55 to a diluent recovery manifold 56. From this manifold, the condensate flows through a separator 57 adapted to remove any water present in the condensate, and is then returned to the propane storage tank 11. The minor impurities substantially free of the propane or other diluent employed are removed from the evaporator 51 by means of a valve 58 and a screw conveyor 59, and constitute one of the products of my process. It is sometimes advantageous to maintain reduced pressures in the evaporator 51 to permit the complete volatilization of the diluent at relatively low temperatures, and for this purpose a pump 60 is shown associated with the line 53. To permit the production of relatively low pressures in the evaporator 51, the valves 48 and 58 may be closed during the period the pump 60 is in operation, thereby providing for the semi-continuous recovery of the diluent from the minor impurities. However, the valves 48 and 58 become unnecessary if self-sealing conveyors are used for the conveyors 49 and 59, and continous or intermittent operation can be employed as desired.

The propane-oil solution withdrawn through the line 37, which solution has been substantially freed from minor impurities, is introduced into a line 70 for transfer to subsequent processing steps. In instances where the oil is substantially free initially from minor impurities, or where it is not deemed necessary to separate the impurities in an initial step, the mixture of propane and oil formed at the juncture 23 may be introduced into the transfer line 70 by means of a line 71, which then serves as a by-pass for the equipment 14. From the line 70, I have provided several alternatives in flow to permit the omission of one or more subsequent refining steps when such steps are deemed unnecessary and/or to change the sequence of subsequent steps to permit the adoption of a refining procedure most suited for the oil being treated and the desired character of the products. In the following discussion, it will be assumed that the oil is best refined by sequential application of alkali-refining, clay treatment, and wintering.

The propane-oil solution is transferred from the line 70 through the line 71a by means of a valve 72, and introduced into the alkali-refining equipment 17 through a valve 73 and a line 74.

The propane-oil solution flowing through the line 74 is brought to appropriate temperature in a heat exchanger 75 and commingled with a properly-proportioned solution of aqueous alkali at a juncture 76 to which the propane-oil solution is delivered by a pump 76a. The aqueous alkali is brought to this juncture 76 from the alkali storage tank 13 by means of a pump 77, a line 78, and a heat interchanger 79 in which the caustic solution is brought to the desired temperature. Sufficient mixing can be effected by bringing the streams together at right angles at the juncture 76, but, if desired, the commingled streams of caustic and propane-oil solution can be passed through a mixing device 80 which may be of any suitable type, for example a mixer constructed with a series of orifice plates through which the commingled streams are forced by the action of the proportioning pumps 76a and 77. The mixture is then passed through a conditioning coil 82 in which the temperature may be further modified, if desired.

The resulting stream is then passed through a line 83 into a decanter 84 in which the foots formed by the action of the alkali on the free fatty acids in the oil are caused to settle. The clarified and purified propane-oil solution is removed from the decanter 84 by means of a pipe 85, and the foots which collect at the bottom of the decanter 84 are removed therefrom, either continuously or intermittently, by means such as a screw conveyor 86. To recover any oil which may be entrained as propane-oil solution in the foots, wash propane is introduced into the conveyor 86 from the propane supply line 25 by means of a valve 87 and a line 87a. The temperature of the wash propane may be suitably adjusted by means of a heat interchanger 88. The mixture of wash propane and foots formed in the conveyor 86 is fed into a decanter 89 in which the foots are allowed to settle and from which the wash liquor containing the major portion of the entrained oil is removed by means of a line 89a and pump 89b. This wash liquid may be advantageously recycled by return to the line 74, as indicated.

The washed foots are removed from the bottom of the decanter 89 by means of a screw conveyor 90 which is provided, in part at least, with a heating jacket 91. This conveyor feeds into an evaporator 92 in which any entrained or dissolved propane is volatilized by the action of the heat imparted thereto by means of the jacket 91, or by further heat which may be supplied to the evaporator 92 by a heating coil 93. The vapors of the propane or other diluent are removed overhead to a vapor line 94, condensed in a condenser 95, and the condensate returned by means of a line 96 to the diluent recovery manifold 56. The volatilization of the diluent in the evaporator 92 may be considerably facilitated by reducing the pressure therein, for which purpose a pump 97 is shown associated with the vapor line 94. The reduction of pressure in the evaporator 92 may be accomplished without difficulty where the conveyor 90 is of the self-sealing type adapted to hermetically seal the evaporator 92 from the decanter 89, and where a conveyor 98 of the same general type is provided at the bottom of the evaporator 92 for removal of the diluent-free foots therefrom. It is sometimes advantageous, however, to provide valves 99 and 100 at the bottom of the decanter 89 and the evaporator 92, respectively, in order to facilitate sealing of the latter when reduced pressures are employed during volatilization of the diluent.

The foots removed by means of the conveyor 98 are substantially free from oil and diluent and may be further handled as desired. In some instances, I find it advisable to employ sufficiently high temperatures and low pressures in the evaporator 92 that the water content of the foots is substantially reduced, whereby a partially dehydrated or completely dehydrated product may be obtained.

The alkali-refined propane-oil solution withdrawn through the line 85 is transferred through a valve 110 to a line 111 and thence through a heat interchanger 111a and to the clay refining unit 18. This unit comprises a vertical vessel 112 filled with a charge of granular clay or fuller's earth 113, which clay is supported on a perforated plate 114 preferably provided on its upper surface with a blanket of mineral wool 115. The propane-oil solution is introduced at the top of the vessel 112 through the line 111 and percolates downwardly through the granular mass of clay 113 and is withdrawn from the bottom of the vessel by means of a pipe 116. The clay-treated propane-oil solution withdrawn through the pipe 116 is conducted through a valve 117 into a line 118 and thence through a valve 119 into a manifold 120 of the chilling apparatus 15.

The chilling apparatus 15 comprises two vessels 121 and 122 into which the propane-oil solution in the line 120 may be alternately introduced by a valve 123 and a valve 124, respectively. The vessel 121 is provided with a vapor line 125 having a valve 126 and connecting into a vapor manifold 127. The vessel 122 is provided with a vapor line 128 having a valve 129 and likewise leading into the vapor manifold 127. This vapor manifold line 127 is provided with a pump 130 and a condenser 131, and a line 132 is provided for return of condensate from the condenser to the diluent recovery manifold 56. The vessel 121 is provided at the bottom with a liquid withdrawal line 133 having a valve 134, and the vessel 122 is provided with a similar withdrawal line 135 having a valve 136, both of these withdrawal lines being manifolded in a common manifold line 137 which is connected by a pump 138 with a filter 139.

When the vessel 121 is partially filled with propane-oil solution from the line 120, the valve 123 is closed and the valve 124 is opened, thereby beginning the charge of the vessel 122. While the vessel 122 is being filled, propane is evaporated from the contents of the vessel 121 by opening the valve 126 and starting the pump 130. This evaporation is continued until the abstraction of the latent heat of vaporization of propane from the contents of the vessel 121 has reduced the temperature therein to a predetermined value. At this low temperature, the higher melting point constituents, or such portion of them as it is desired to separate, will have crystallized from the propane-oil solution so that the contents of the vessel represent a thin slurry of solid stearin or similar material suspended in the fluid propane-oil solution. The valve 126 is then closed, and the valve 134 is opened, permitting the passage of the slurry into the manifold 137. The slurry is then passed by means of the pump 138 into the closed filter 139 in which the solid constituents are retained as a filter cake on filter leaves (not shown) and from which fluid constituents are withdrawn by means of a line 140. As soon as the vessel 121 is emptied of its low temperature slurry, it is started again on the charging phase of its cycle. A similar cycle of charging, chilling, and withdrawing is employed with the vessel 122.

When a sufficient cake of solids is built up in the filter 139, the flow of low temperature slurry therethrough is temporarily stopped, and wash propane from the line 25 is transferred through a line 141, brought to the proper temperature in the heat exchanger 142, and passed through the filter 139 to wash the cake free from any residual oil. The propane wash is withdrawn through the line 140. When the filter cake is sufficiently washed, it is caused to separate from the filter leaves, for example by applying a slight back pressure to the filter, and to fall into a hopper 143 associated with the filter 139. From the hopper 143, the solid constituents are conveyed by means of a screw conveyor 144, which may be provided with a heating jacket 145, into an evaporating vessel 146 equipped with a heating coil 147. The stearins and other solids are heated sufficiently in the evaporator 146 to volatilize any diluent associated therewith, and are preferably heated to such a temperature that they are melted and reduced to a fluid condition. The vapors are removed through a line 148 leading into a vapor manifold 149 in which they are transferred to a condenser 150 arranged to return condensate to the diluent recovery line 56. A pump 151 is associated with the vapor manifold 149 whereby the evaporation may be carried out at diminished pressures if desired. The melted stearins free from dissolved diluent are removed from the evaporator 146 by means of a line 152 and a pump 153 and represent one of the products of my process.

The filtrate and wash liquor from the filter 139, which are withdrawn through the line 140, are transferred into a manifold line 154 and, passing through a valve 155, are introduced into the evaporator 19. This evaporator comprises a closed tank 156 having a heating coil 157 and a vapor line 158 leading into the vapor manifold 149. The refined wintered oil is freed from the solvent or diluent associated therewith in the evaporator 19, suitable conditions of temperature and pressure being maintained therein for the substantially complete removal of the solvent or diluent by appropriate adjustment of the heat imparted to the oil by the heating coil 157 and of the pressure on the oil by adjustment of the pump 151. The refined oil free from diluent is removed from the evaporator 19 by means of a line 160 and a pump 161, and constitutes the chief product of my process.

When degumming is the only refining step which it is desired to employ, the propane-oil solution in the transfer line 70 may be brought directly to the evaporator 19 by means of valves 200 and 201, a pipe 202, and a pipe 203. When it is desired to remove the stearins or other high melting point constituents without employing the alkali-refining and clay-treating steps, the propane-oil solution in the line 70 may be initially brought into the chilling equipment 15 by opening the valve 200, the valves 72, 119, and 201 being closed. When it is desired to clay treat the propane-oil solution before the step of alkali-refining, the valve 73 in the line 71a is closed and the contents of the line 71a diverted through a line 204 and a valve 205 into the line 111. The valve 117 on the withdrawal line 116 from the clay treater 18 is then likewise closed, and the clay-treated propane-oil solution is transferred by means of a valve 206 and a line 207 leading to and connecting with the pipe 74, whereafter the propane-oil solution may be alkali-refined. Or, if desired, the alkali-refining step may be omitted by closing the valve 206 and opening the valve 117, thus sending the oil to the chilling equipment 15 or evaporating equipment 19, as may be desired. Or, in those instances where it is desired to alkali-treat without clay-treating, the clay treater 18 may be by-passed by means of a valved by-pass line 208. A valved by-pass line 209 has also been provided between line 118 and line 203 for by-passing the alkali and/or clay-treated propane-oil solution directly to evaporator 19 when it is not desired to practice the step of wintering.

The removal of higher melting point constituents may also serve as a step preliminary to the steps of alkali-refining and/or clay-treating, in which case the low temperature filtrate in manifold 154 is diverted from its flow toward evaporator 19 by closing valve 155 and opening valve 210 in a transfer line 211 leading from the manifold line 154 to the line 71a.

My process, as described, is dependent upon the use of suitable diluents and, as I have indicated, I have found that the liquefied, normally gaseous hydrocarbons are particularly advantageous diluents. By the term "liquefied, normally gaseous hydrocarbons," I have particular reference to such hydrocarbons as propane and butane, which may be liquefied at atmospheric temperatures without the necessity of imposing unduly high pressures thereon. Where reference is made to propane or any other individual hydrocarbon, I do not mean to imply that I employ the pure hydrocarbon exclusively, but I employ the terms in their commercial significance to indicate a propane cut or a butane cut such as may be taken from suitable plates in a refinery stabilization column. A propane cut, for example, will consist largely of propane, together with some butane, and will have minor proportions of lighter materials, such as methane and ethane, and also minor proportions of heavier materials such as pentane. Such a cut is gaseous at ordinary temperatures and pressures but may be liquefied by the imposition of several atmospheres pressure.

Among the advantages resulting from the employment of liquefied, normally gaseous hydrocarbons as diluents are the ease of removal of the diluents from the finished product at relatively low temperatures not injurious to the product, the ease of obtaining low processing temperatures by refrigerative evaporation of the diluent, the greatly reduced viscosity and density obtainable by blending these very light hydrocarbons with the oil, whereby processes such as filtration and settling are greatly facilitated, the latter to such a marked extent that simple decantation vessels may be used, if desired, to provide a continuous means for separation of the impurities from the oil-propane mixture, and the highly selective character of the diluent, which in each refining step serves to reduce the loss of good oil, to increase the degree to which impurities are removed when the oil is refined, and to reduce the quantity of refining agent, if any, necessary for the removal of such impurities.

The highly selective character of the liquefiable, normally gaseous hydrocarbon serves to improve the efficiency of each refining step. In degumming, there is in most instances a rejection or precipitation of the minor impurities arising solely from the selective action of the propane or similar diluent, and, in other instances, such impurities are brought to the point of incipient precipitation whereby they are very readily removed by the hydrating action of a little water or the precipitating action of a small amount of precipitating agent, e. g., an aqueous solution of an electrolyte. In the step of alkali-refining, one important feature attributable to the selectivity of the diluent is the production of a neutralized oil substantially free from any dissolved soap. Propane and other normally gaseous, liquefiable hydrocarbons have substantially no solvent power for alkali soaps and, in this capacity, they may be contrasted with other hydrocarbon diluents such as benzene, the latter, for example, having an appreciable solvent power for alkali soaps. Another feature of importance in steps such as alkali-refining in which aqueous solutions are used is the complete immiscibility with water of my preferred class of diluents, whereby no mutual solubility effects arise which would tend to cut down sharpness of separation between the phases. In addition to removal of free fatty acids, alkali tends to remove certain oxygenated color bodies, thereby giving an alkali bleach. This tendency is greatly enhanced in the presence of propane or similar diluent which serves to bring such oxygenated color bodies to the point of incipient precipitation and thereby greatly facilitates their removal by the alkali. Similar selective effects tend to increase the bleaching and removal of color bodies obtainable by contact with an adsorptive agent whereby the effectiveness of the adsorptive agent is very substantially increased, its life or refining capacity prolonged or increased, and whereby the desired bleach may be obtained at substantially lower contact temperatures than ordinarily employed. I also find that, at reduced temperatures, propane is selective in its solvent power as regards low and high melting point constituents, whereby the precipitation of the latter from a chilled mixture is made more selective and complete.

The low density and viscosity of the propane-oil mixture greatly facilitates all separative processes, such as the decanting and filtering processes illustrated in the drawing, and other separative expedients which may be employed if desired, such as separation by centrifuging which can be used instead of the settling vessels shown without departure from the spirit of the invention. In addition, the greatly reduced viscosity of the mixture facilitates reactions between heterogeneous phases which are dependent upon diffusion to the interface, for example, the neutralization of free fatty acids by contacting the propane-oil mixture with aqueous alkali.

The optimum temperatures and propane-oil ratios will vary according to the character of the oil being treated and the desired character of the products, and cannot be given with exactitude. I usually prefer to commingle the diluent and crude oil at elevated temperatures, for example, by preheating the respective streams, in order to obtain a more homogeneous initial solution, although, with other more fluid oil, such preheating becomes unnecessary. The subsequent refining steps may be carried out at various temperatures at, above, or below atmospheric temperature, depending upon the character of the oil and the refining procedure. The degumming operation may be carried out over a wide range of temperatures, although at atmospheric temperatures and below, the rejection is usually more complete than at somewhat more elevated temperatures. However, at considerably more elevated temperatures, for example around 150° F., the rejection of minor impurities is again quite complete.

The alkali-refining step can also be carried out over a wide range of temperatures, although, as a rule, I find that the reaction is more rapid and the separation more complete at elevated temperatures. As a general rule, I find that temperatures in excess of 150 or 180° F. are rarely advisable and, usually, the desired refining can be obtained at substantially lower temperatures.

The step of clay refining may be conducted to advantage at elevated temperatures, for example, temperatures similar to those used in the alkali-refining step. In general, these temperatures will be well below the dehydration temperatures of the clay and I prefer, therefore, to use a clay which has been previously dehydrated to the desired reactivity.

The temperature to which the propane-oil mixture is chilled in the wintering process will depend upon the stearin content of the crude oil and the desired melting point of the wintered oil, and may be readily determined in practice to give the desired results. As a rule, such wintering operations will be carried out at sub-zero temperatures.

The volume ratio of propane to oil may vary over a very wide range, for example, from one-half to four or five, or more. I usually prefer to use several volumes of propane per volume of oil in precipitating the minor impurities, but the optimum ratio will vary according to the character of the crude oil, temperature of treatment, and other factors. If desired, the quantity of propane may be somewhat reduced in steps subsequent to degumming. Expedients may be provided, if desired, to change the propane-oil ratio between various of the refining steps, such an expedient comprising an evaporator and/or a propane addition line associated with the transfer line between the refining units. It is usually sufficient, however, to maintain the same propane-oil ratio throughout the entire refining steps, for example, a ratio of one to three volumes of propane per volume of oil, until such time as the evaporative chilling is resorted to in the chilling equipment 15. If the removal of the higher melting point constituents is practiced as one of the earlier steps, then a sufficiently high propane-oil ratio should be employed initially to leave sufficient propane in the filtrate to properly dilute the oil for the remaining steps, or, if desired, make-up propane may be added, suitably through the wash line leading to the filter.

The equipment should be closed throughout and constructed to withstand the vapor pressures of the diluent at the temperatures employed. Various changes in the character of the equipment and procedural steps may be made, if desired. For example, in place of the decanters and filters, centrifuges adapted to operate under pressure may be very advantageously used as separating means for removing the precipitated minor impurities or foots from alkali-refining and the like. Instead of the percolation tower for treating with clay, a continuous contact filtration method may be used in which a clay slurry is introduced into the propane-oil mixture and then removed therefrom by means of filters or centrifuges. Many other modifications of the process will also be apparent to one skilled in the art.

The process is, in general, applicable to glyceride oils and fats of animal and vegetable origin and, while it has been illustrated with particular reference to oils, it is likewise applicable to fats which are solid at normal temperatures, and I intend to term "fatty oil" to cover such fats. Certain of the refining steps, for example, clay treatment and separation of higher melting point constituents in the presence of the preferred diluent, may be applied to the purification or separation of fatty acids.

It is to be understood that various modifications in apparatus and procedure may be made without departing from my invention as defined by the scope of the appended claims.

I claim as my invention:

1. The process of removing gummy materials from crude fatty material containing the same which comprises the steps of mixing said crude fatty material with liquefied normally gaseous hydrocarbon to dissolve the fatty material and precipitate gummy material, and separating said precipitated gummy material from said fatty material, said steps being carried on in the presence of said hydrocarbon and under sufficient pressure to maintain said hydrocarbon in liquid form.

2. The process of removing gummy materials from crude fatty material containing the same, which comprises the steps of, mixing said crude fatty material with a liquefied normally gaseous hydrocarbon to dissolve the fatty material and precipitate gummy material, separating the precipitated gummy material from said fatty material, thereafter treating the fatty material with a solid adsorbent and separating said fatty material from said adsorbent and impurities adsorbed thereon, said steps being carried on in the presence of said hydrocarbon and under sufficient pressure to maintain said hydrocarbon in liquid form.

3. The process of refining crude fatty oils containing gummy materials and free fatty acids, which comprises the steps of, mixing said fatty oil with a liquefied normally gaseous hydrocarbon to dissolve said fatty oil and precipitate said gummy materials from said oil, separating the precipitated gummy material from said fatty material, thereafter mixing an aqueous neutralizing agent with said oil to neutralize said free fatty acids and precipitate soapstock, and separating said soapstock from said oil, said steps being carried on in the presence of said hydrocarbon and under sufficient pressure to maintain said hydrocarbon in liquid form.

4. The process of refining crude fatty oils containing gummy materials and free fatty acids, which comprises the steps of, mixing said fatty oil with a liquefied normally gaseous hydrocarbon to dissolve said fatty oil and precipitate said gummy materials, separating said precipitated gummy materials from said oil, thereafter mixing an aqueous neutralizing agent with said oil to neutralize said free fatty acids and precipitate soapstock, separating said soapstock from said oil, thereafter adding a solid adsorbent to said oil and separating said oil from said adsorbent and impurities adsorbed thereon, said steps being carried on in the presence of said hydrocarbon and under pressure sufficient to maintain said hydrocarbon in liquid form.

5. The process of refining crude fatty oils containing gummy materials and free fatty acids, which comprises the steps of mixing said fatty oil with a liquefied normally gaseous hydrocarbon to dissolve said fatty oil and precipitate said gummy materials, separating said precipitated gummy materials from said oil, thereafter mixing an aqueous refining agent with said oil to precipitate foots, and separating said foots from said oil, said steps being carried on in the presence of said hydrocarbon and under sufficient pressure to maintain the said hydrocarbon in liquid form.

6. A process as defined in claim 1, in which the separation is effected within an elevated temperature range sufficiently high to cause substantial rejection of the gummy material from the fatty material but at a temperature at which said hydrocarbon remains liquid at said pressure.

7. A process as defined in claim 6, in which said elevated temperature range begins at about 150° F.

8. A process as in claim 6, in which the precipitation is assisted by the addition of a little water to hydrate impurities in the fatty material.

9. A process as defined in claim 1, in which the crude fatty material and the liquefied normally gaseous hydrocarbon are subjected to a temperature of around 150° F. to effect rejection of the gummy material and separation thereof from said fatty material.

10. A process as defined in claim 1, in which the separation is effected within an elevated temperature range sufficiently high to cause substantial rejection of the gummy material from the fatty material but at a temperature at which said hydrocarbon remains liquid at said pressure and in which at least several volumes of hydrocarbon are employed per unit volume of fatty material.

11. A process as defined in claim 1, in which said steps are performed in the presence of a small amount of water.

12. A process as defined in claim 1, in which the separated gummy material comprises gums and oil, and including the step of subjecting the separated gummy material to further fractionation while admixed with liquefied, normally gaseous hydrocarbon to recover oil therefrom.

13. A process as defined in claim 12, in which the further fractionation is effected by contact with added hydrocarbon.

14. The process as defined in claim 1, in which the separation is effected within an elevated temperature range sufficiently high to cause substantial rejection of the gummy material from a fatty material component but at a temperature at which said hydrocarbon remains liquid at said pressure and in which the hydrocarbon solution of degummed fatty material is subjected to further fractionation to reject a further fatty material component therefrom, said fractionation being conducted in the presence of at least a portion of said liquefied normally gaseous hydrocarbon.

15. The process as defined in claim 14, in which a stearine component is rejected from one of said fatty material components by chilling.

16. The process as defined in claim 1, in which separation is effected at a temperature not substantially higher than atmospheric temperatures.

17. The process as defined in claim 16, in which precipitation is assisted by the addition of a little water to hydrate impurities in the fatty material.

18. The process as defined in claim 17, in which the ratio of liquefied hydrocarbon to fatty material is from about ½ to 4.

19. A process as defined in claim 1, in which the separated gummy material comprises gums and oil, and including the step of washing the separated gummy material with an additional quantity of liquefied normally gaseous hydrocarbon to recover oil from the separated gummy material, said washing being effected under sufficient pressure to maintain said hydrocarbon in liquid form.

FREDERICK J. EWING.

No references cited.